United States Patent
Benedict et al.

(10) Patent No.: US 9,853,277 B2
(45) Date of Patent: Dec. 26, 2017

(54) BUS BAR ASSEMBLY INCLUDING BIASED BUS BAR

(71) Applicant: FORD GLOBAL TECHNOLOGIES, LLC, Dearborn, MI (US)

(72) Inventors: Scott Benedict, Plymouth, MI (US); Tom M. Gunther, Canton, MI (US); Stuart Schreiber, Dearborn Heights, MI (US); Francisco Fernandez, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/744,455

(22) Filed: Jun. 19, 2015

(65) Prior Publication Data

US 2016/0372733 A1     Dec. 22, 2016

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC . H01M 2/206; H01M 2/1077; H01M 2220/20
See application file for complete search history.

(56) References Cited

U.S. PATENT DOCUMENTS

| | | |
|---|---|---|
| 8,114,540 B2 | 2/2012 | Trester et al. |
| 8,765,289 B2 | 7/2014 | Ikeda et al. |
| 8,941,386 B2 | 1/2015 | Ikeda et al. |
| 2009/0274956 A1 | 11/2009 | Kosugi et al. |
| 2012/0212232 A1 | 8/2012 | Ikeda et al. |
| 2012/0288743 A1 | 11/2012 | McLaughlin et al. |
| 2013/0252052 A1 | 9/2013 | Dawley |
| 2013/0302662 A1 | 11/2013 | Ogasawara et al. |

FOREIGN PATENT DOCUMENTS

JP       2006210318 A   *   8/2006

* cited by examiner

*Primary Examiner* — Jane Rhee
(74) *Attorney, Agent, or Firm* — Carlson, Gaskey & Olds

(57) ABSTRACT

An assembly according to an exemplary aspect of the present disclosure includes, among other things, a plurality of battery cells and a bus bar assembly received over the plurality of battery cells. The bus bar assembly comprises a housing, a bus bar received within the housing and a retention device disengageable from the bus bar to move the bus bar between a first position and a second position.

20 Claims, 7 Drawing Sheets

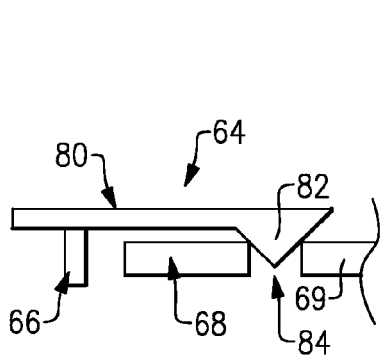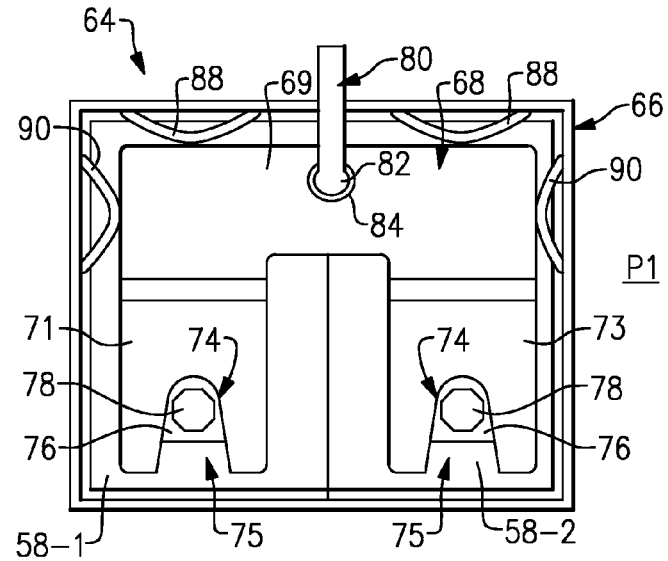
FIG.4A  FIG.4B
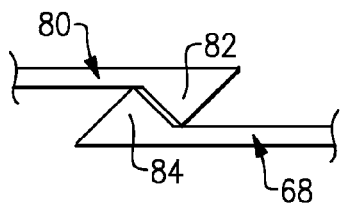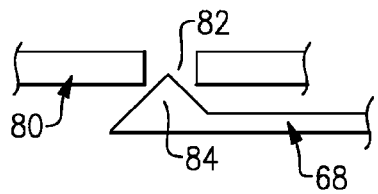
FIG.5  FIG.6
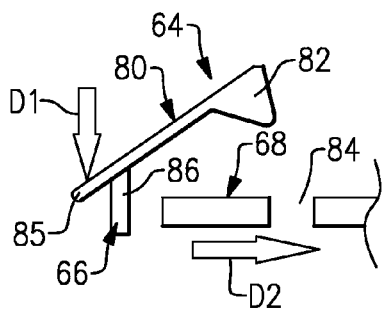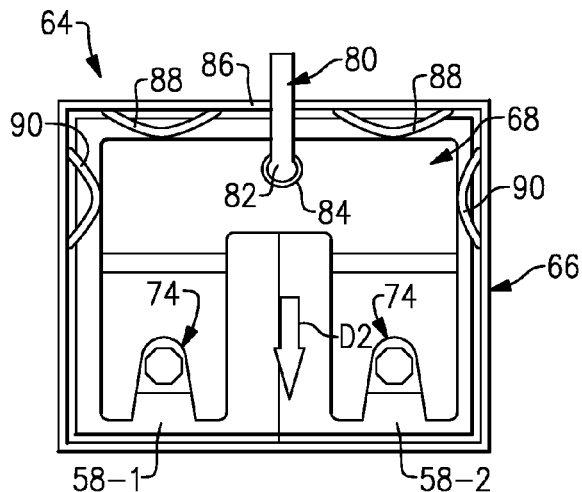
FIG.7A  FIG.7B

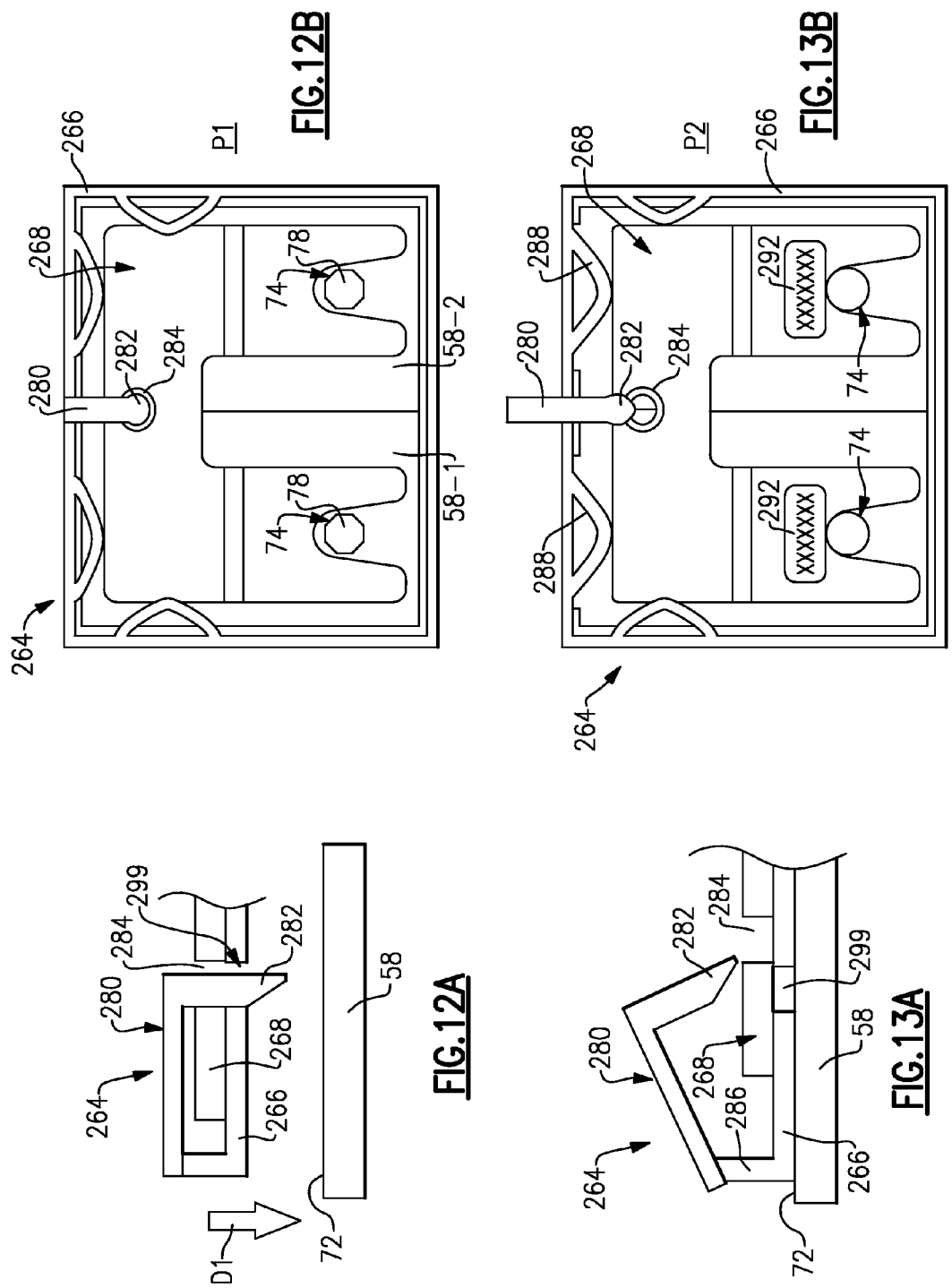

BUS BAR ASSEMBLY INCLUDING BIASED BUS BAR

TECHNICAL FIELD

This disclosure relates to a bus bar assembly for electrically connecting a grouping of battery cells of an electrified vehicle battery pack. The bus bar assembly includes a housing and a bus bar that is retained in a first position relative to a battery cell terminal and is movable to a second position relative to the battery cell terminal.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

The powertrain of an electrified vehicle is typically equipped with a high voltage battery pack that includes one or more battery arrays. Each battery array includes a grouping of battery cells that store electric power for powering the electric machines and other electric loads of the vehicle. The battery cells must be reliably connected to one another in order to achieve the voltage and power levels necessary for powering these electric loads. Bus bars and other devices are commonly used to sufficiently connect the battery cells.

SUMMARY

An assembly according to an exemplary aspect of the present disclosure includes, among other things, a plurality of battery cells and a bus bar assembly received over the plurality of battery cells. The bus bar assembly comprises a housing, a bus bar received within the housing and a retention device disengageable from the bus bar to move the bus bar between a first position and a second position.

In a further non-limiting embodiment of the foregoing assembly, the bus bar is connectable to a terminal of a first battery cell and a terminal of a second battery cell in the second position.

In a further non-limiting embodiment of either of the foregoing assemblies, the housing is made of a first material and the bus bar is made of a second, different material.

In a further non-limiting embodiment of any of the foregoing assemblies, the retention device includes a first retention feature configured to engage a second retention feature of the bus bar to retain the bus bar in the first position.

In a further non-limiting embodiment of any of the foregoing assemblies, the first retention feature is a tab or an aperture and the second retention feature is the other of the tab and the aperture.

In a further non-limiting embodiment of any of the foregoing assemblies, the bus bar includes a body and a first leg and a second leg that protrude from the body.

In a further non-limiting embodiment of any of the foregoing assemblies, each of the first leg and the second leg includes a slot.

In a further non-limiting embodiment of any of the foregoing assemblies, a bottom of the slot abuts a battery cell terminal in the second position.

In a further non-limiting embodiment of any of the foregoing assemblies, the bus bar includes a first bus bar portion and a second bus bar portion separate from the first bus bar portion.

In a further non-limiting embodiment of any of the foregoing assemblies, each of the first bus bar portion and the second bus bar portion include a first opening configured to receive the retention device and a second opening configured to receive a portion of a battery cell terminal.

In a further non-limiting embodiment of any of the foregoing assemblies, the retention device includes an arm that is integral with the housing.

In a further non-limiting embodiment of any of the foregoing assemblies, the retention feature includes an arm that is attached to the housing.

In a further non-limiting embodiment of any of the foregoing assemblies, at least one biasing member is configured to move the bus bar toward the second position upon disengaging the retention feature from the bus bar.

In a further non-limiting embodiment of any of the foregoing assemblies, the at least one biasing member is a spring.

In a further non-limiting embodiment of any of the foregoing assemblies, the at least one biasing member is a flexible portion of the housing.

A method according to another exemplary aspect of the present disclosure includes, among other things, positioning a bus bar within a bus bar assembly to locate the bus bar in a first position relative to a battery cell terminal, holding the bus bar in the first position and moving the bus bar from the first position to a second position.

In a further non-limiting embodiment of the foregoing methods, the moving step includes moving a first bus bar portion and a second bus bar portion in opposite directions from one another.

In a further non-limiting embodiment of either of the foregoing methods, the method includes disengaging a retention device of the bus bar assembly from the bus bar to move the bus bar from the first position toward the second position.

In a further non-limiting embodiment of any of the foregoing methods, the holding step includes retaining the bus bar in the first position with a retention device.

A bus bar assembly according to another exemplary aspect of the present disclosure includes, among other things, a housing, a bus bar received within the housing and a retention device disengageable from the bus bar to move the bus bar between a first position and a second position relative to the housing.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 4A and 4B illustrate a bus bar assembly according to a first embodiment of this disclosure.

FIG. 5 illustrates an exemplary retention configuration for retaining a bus bar of a bus bar assembly.

FIG. 6 illustrates another exemplary retention configuration for retaining a bus bar of a bus bar assembly.

FIGS. 7A and 7B schematically illustrate disengagement of a retention device from a bus bar of the bus bar assembly of FIGS. 4A and 4B.

FIGS. 12A and 12B illustrate a bus bar assembly according to yet another embodiment of this disclosure.

FIGS. 13A and 13B illustrate the bus bar assembly of FIGS. 12A and 12B after movement of a bus bar to a second position.

DETAILED DESCRIPTION

This disclosure details a battery array for an electrified vehicle battery pack. The battery array includes a plurality of battery cells and a bus bar assembly disposed over the battery cells. The bus bar assembly may include a housing, a bus bar, and a retention device configured to hold the bus bar in a first position within the housing. The retention device may be disengaged from the bus bar to move the bus bar from the first position to a second, different position. A biasing member of the bus bar assembly is configured to move the bus bar to the second position after the retention device has disengaged from the bus bar. The bus bar is properly positioned and aligned for connection to a battery cell terminal once moved to the second position. These and other features are discussed in greater detail in the following paragraphs of this detailed description.

Figure 1:
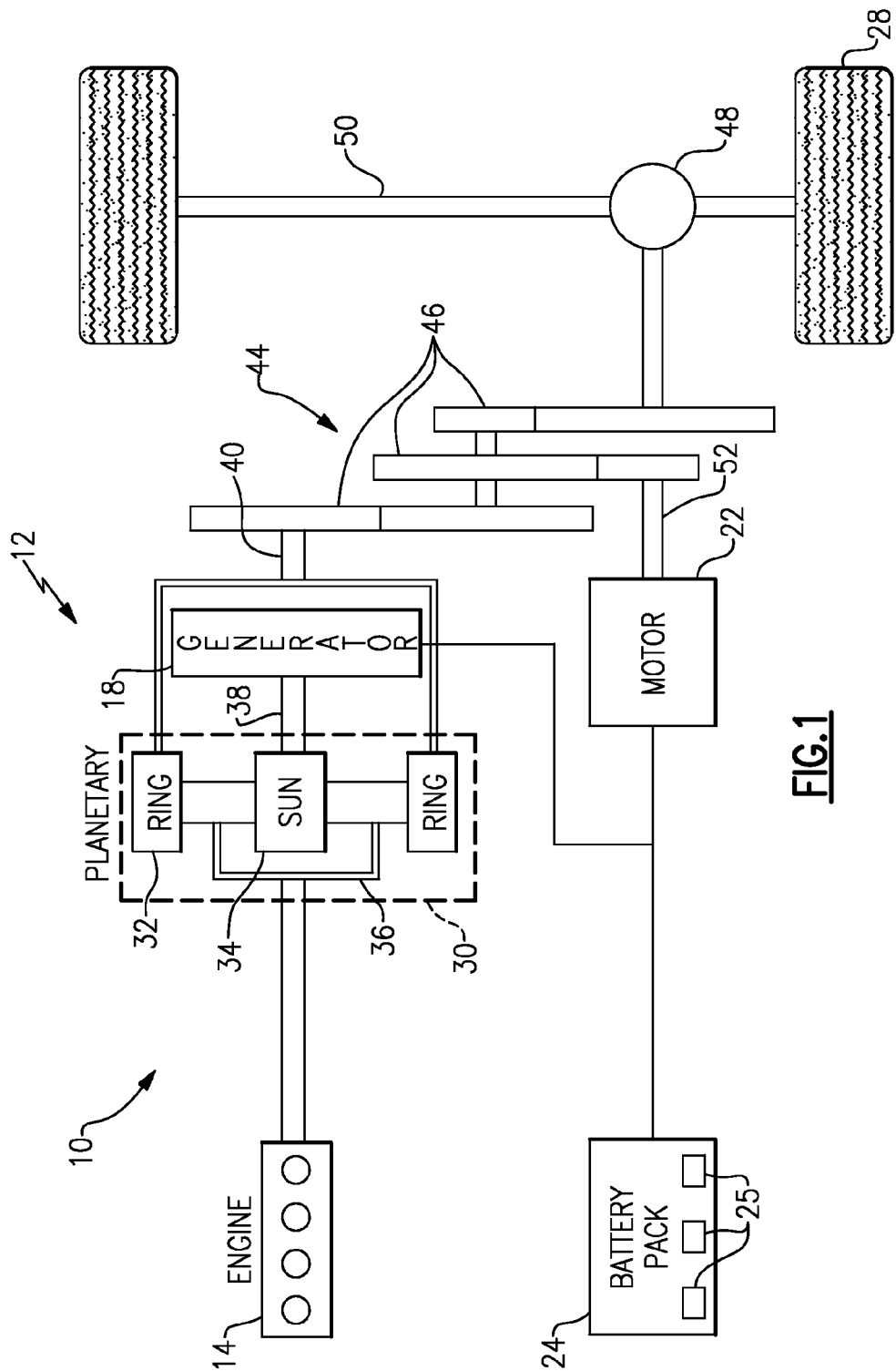
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery arrays 25 (i.e., groupings of battery cells) capable of outputting electrical power to operate the motor 22, the generator 18 and/or other electrical loads. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
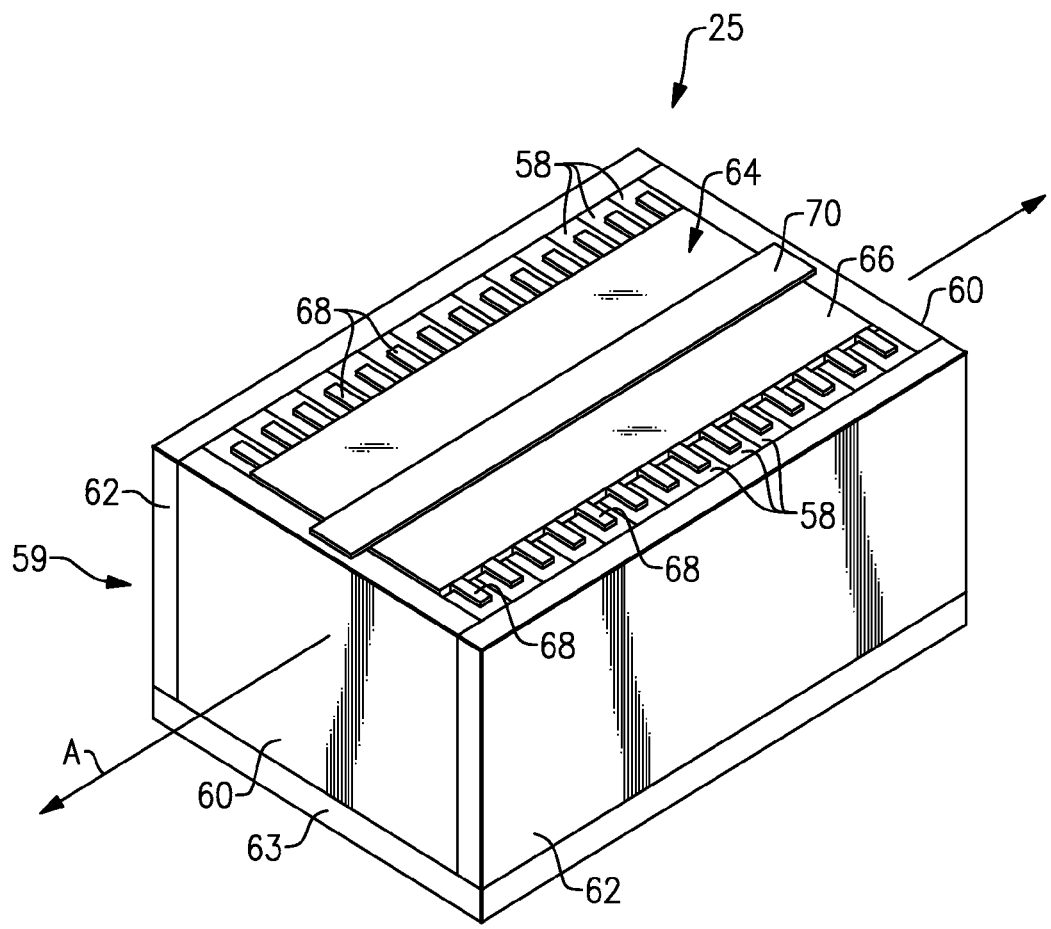
FIG. 2 illustrates a battery array according to an embodiment of this disclosure.

FIG. 2 illustrates a battery array 25 that can be incorporated into an electrified vehicle. For example, the battery array 25 could be part of the battery pack 24 of the electrified vehicle 12 of FIG. 1. The battery array 25 includes a plurality of battery cells 58 for supplying electrical power to various components of the electrified vehicle 12. Although a specific number of battery cells 58 are illustrated in FIG. 2, the battery array 25 could include a greater or fewer number of battery cells within the scope of this disclosure. In other words, this disclosure is not limited to the specific configuration shown in FIG. 2.

The battery cells 58 may be stacked side-by-side along a longitudinal axis A to construct a grouping of battery cells 58, sometimes referred to as a "cell stack." In one embodiment, the battery cells 58 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

A support structure 59, sometimes referred to as an "array structure" or "array support structure," generally surrounds the battery cells 58. The support structure 59 may include opposing end walls 60 disposed at the longitudinal extents of the grouping of battery cells 58 and opposing side walls 62 that extend on both sides of the battery array 25 between the opposing end walls 60. The end walls 60 and the side walls 62 cooperate to hold the battery cells 58 under compression relative to one another. The side walls 62 may be connected to the end walls 60 in any known manner. In another embodiment, the support structure 59 includes a bottom plate 63, which can be configured as a heat exchanger plate to remove heat generated by the battery cells 58.

The battery array 25 may additionally include a bus bar assembly 64. The bus bar assembly 64 rests atop the battery cells 58 and is configured to electrically connect the battery cells 58 of the battery array 25. In one non-limiting embodiment, the bus bar assembly 64 includes a housing 66, one or more bus bars 68, and a retention bar 70. The housing 66 may be made of a plastic material, and the bus bars 68 may be made of a metallic material.

The bus bars 68 are received within the housing 66 such that the bus bars 68 are properly oriented relative to the battery cells 58, and more specifically relative to terminals of the battery cells 58. The bus bars 68 may be attached, such as by welding, to one or more terminals of the battery cells 58 so that electrical energy communicates to and from the battery cells 58 through the bus bars 68. In another embodiment, the bus bars 68 may be attached to one or more terminals of the battery cells 58 by a mechanical joint such as a threaded stud and nut.

The retention bar 70 may optionally extend over the housing 66 to retain the bus bar assembly 64 against the battery cells 58 and to provide rigidity to the battery array 25. In another non-limiting embodiment, the retention bar 70 biases the battery cells 58 toward the bottom plate 63.

The depiction of the bus bar assembly 64 shown in FIG. 2 is highly schematic. Accordingly, additional details of the bus bar assembly 64 are detailed below.

Figure 3:
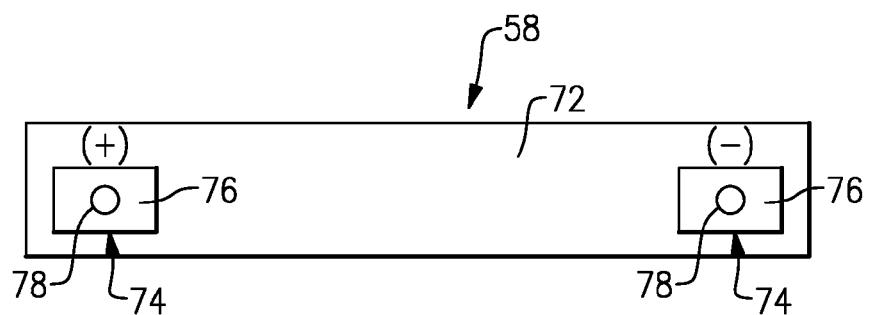
FIG. 3 is a top view of a battery cell of the battery array of FIG. 2.

FIG. 3 illustrates an exemplary battery cell 58 of the battery array 25 described above. The battery cell 58 includes a top surface 72 and a pair of terminals 74 that extend outwardly from the top surface 72. The terminals 74 may be disposed near opposite ends of the top surface 72. One of the terminals 74 is a positive terminal (designated by the symbol (+)) and the other terminal 74 is a negative terminal (designed by the symbol (−)). The battery cell 58 may be arranged such each terminal 74 is disposed adjacent to a terminal of an adjacent battery cell having an opposite polarity. For example, with reference to the embodiment of FIG. 2, each bus bar 68 could connect to a positive terminal on one battery cell 58 and a negative terminal on an adjacent battery cell 58. In another embodiment, although not specifically shown, the battery cell 58 could be arranged such that each terminal 74 is disposed adjacent to a terminal of an adjacent battery cell having the same polarity.

Each terminal 74 includes a contact surface 76 and a pillar 78 that protrudes upwardly from the contact surface 76. A bus bar (not shown in FIG. 3) may be attached (e.g., welded) to one or both of the contact surface 76 and the pillar 78 to electrically connect the battery cell 58 to adjacent battery cells.

FIGS. 4A and 4B illustrate portions of the bus bar assembly 64. One of the bus bars 68 is positioned at a first position P1 relative to the housing 66 and the terminals 74 of two adjacent battery cells 58-1, 58-2. Although only a single bus bar 68 is shown, a plurality of bus bars 68 could be received within the housing 66. In one non-limiting embodiment, the bus bar 68 includes a body 69 and a first leg 71 and a second leg 73 that extend from the body 69 (see FIG. 4B). Stated another way, the body 69 establishes a bridge between the first leg 71 and the second leg 73 to establish a horseshoe shaped bus bar.

Each of the first leg 71 and the second leg 73 of the bus bar 68 may include a slot 75 configured to at least partially wrap around one of the terminals 74 of the battery cells 58. The slots 75 may taper outwardly toward ends of the first leg 71 and the second leg 73. However, the slot 75 could include other shapes and configurations. In one non-limiting embodiment, the bus bar 68 does not contact the pillars 78 of the terminals 74 when arranged in the first position P1.

A retention device 80 may engage the bus bar 68 to hold it in the first position P1. The retention device 80 may be integral to the housing 66 or could be a separate component that is attached to the housing 66. In one non-limiting embodiment, the retention device 80 is configured as an arm that includes a first retention feature 82 configured to engage a second retention feature 84 of the bus bar 68. In this non-limiting embodiment, the first retention feature 82 is a tab and the second retention feature 84 is an aperture formed in the body 69 of the bus bar 68. In another non-limiting embodiment, both the first retention feature 82 and the second retention feature 84 are tabs (see FIG. 5) that abut one another to hold the bus bar 68 in the first position P1. In yet another non-limiting embodiment, the first retention feature 82 is an aperture formed in the retention device 80 and the second retention feature 84 is a tab that protrudes from the bus bar 68 and into the aperture to hold the bus bar 68 in the first position P1 (see FIG. 6).

Referring now to FIGS. 7A and 7B, the retention device 80 may be actuated to disengage the first retention feature 82 from the second retention feature 84. In one embodiment, the first retention feature 82 is disengaged from the second retention feature 84 by applying a force in a direction D1 to an end portion 85 of the retention device 80 that is opposite from the first retention feature 82. Applying the force in the direction D1 causes the retention device 80 to pivot about a wall 86 of the housing 66, thereby moving the first retention feature 82 outwardly in a direction away from the second retention feature 84 and the bus bar 68. Disengaging the retention device 80 from the bus bar 68 enables the bus bar 68 to begin moving in a second direction D2 toward the terminals 74 of the battery cells 58-1, 58-2. In one non-limiting embodiment, the second direction D2 is generally perpendicular to the first direction D1.

Figure 8A:
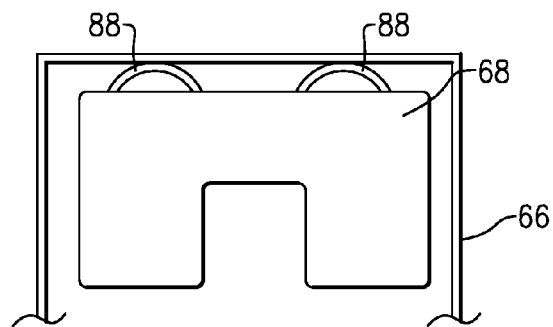
FIGS. 8A and 8B illustrate exemplary biasing members of the bus bar assembly of FIGS. 4A and 4B.
Figure 8B:
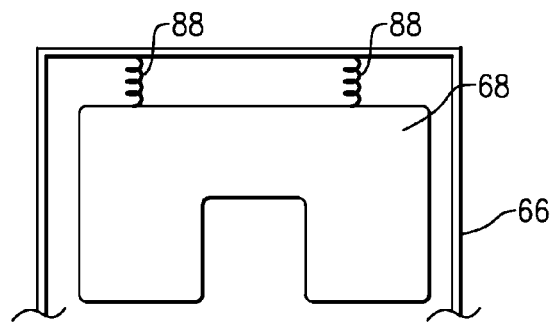

The bus bar assembly 64 may further include one or more biasing members 88 configured to move the bus bar 68 in the second direction D2 after disengaging the retention device 80 from the bus bar 68. In one non-limiting embodiment, the biasing members 88 are biased toward the terminals 74 such that the bus bars 68 are also biased toward the terminals 74. The biasing members 88 may be part of the housing 66 (see FIGS. 4B and 7B), part of the bus bar 68 (see FIG. 8A), or could be a separate spring that is connected to both the housing 66 and the bus bar 68 (see FIG. 8B).

In another embodiment, the bus bar assembly 64 includes additional biasing members 90 disposed along the sides of the bus bar 68 and configured to center the bus bar 68 relative to the terminals 74. In this way, the biased bus bar 68 can absorb the various tolerances between the numerous components of a battery array during its assembly.

Figure 9A:
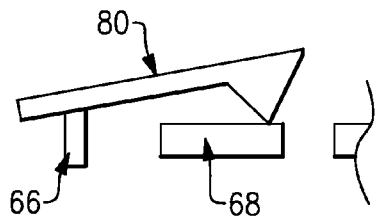
FIGS. 9A and 9B illustrate the bus bar assembly of FIGS. 4A and 4B after movement of the bus bar to a second position.
Figure 9B:
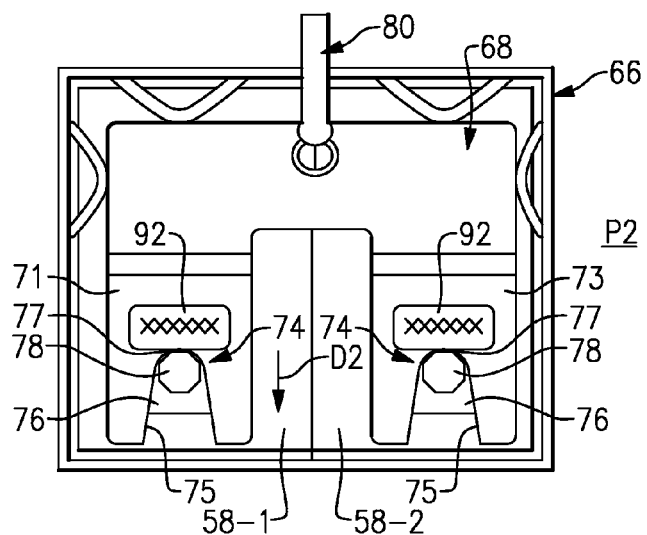

FIGS. 9A and 9B illustrate the bus bar 68 positioned in a second position P2 after having moved in the direction D2. In the second position P2, the slots 75 of the first leg 71 and the second leg 73 of the bus bar 68 are received about the terminals 74 of the battery cells 58-1, 58-2 such that the terminals 74 abut a bottom 77 of the slot 75. The bus bar 68 is also aligned with the pillars 78 of the terminals 74 and overlaps with the contact surface 76 of the terminals 74 in the second position P2. Stated another way, movement of the bus bar 68 to the second position P2 automatically aligns and positions the bus bar 68 in a welding position relative to the terminals 74. The bus bar 68 can then be welded to the terminals 74 to electrically connect the battery cells 58-1, 58-2. Welds 92 are schematically shown to illustrate this connection. In another embodiment, although not specifically shown, the bus bars 68 may be attached to one or more terminals of the battery cells 58 by a mechanical joint such as a threaded stud and nut.

Figure 10A:
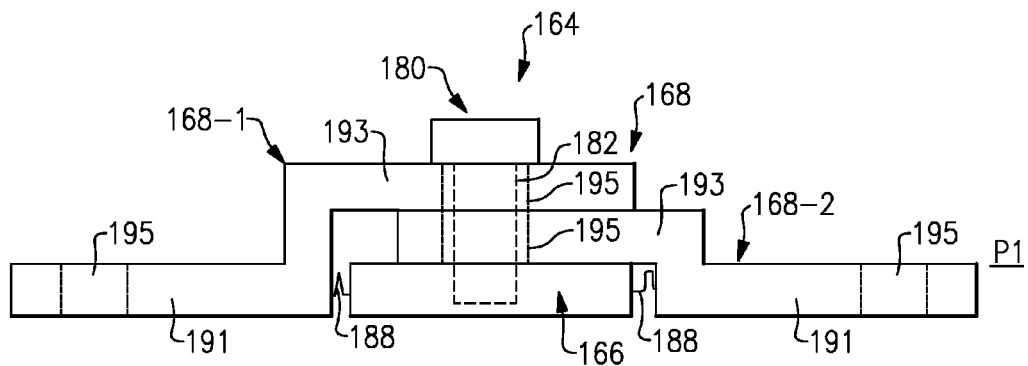
FIGS. 10A and 10B illustrate a bus bar assembly according to another embodiment of this disclosure.
Figure 10B:
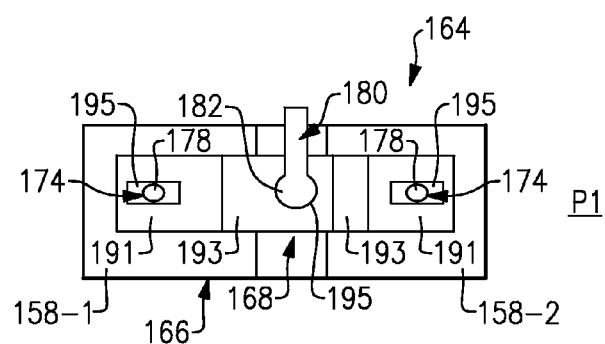

FIGS. 10A and 10B illustrate another exemplary bus bar assembly 164. In this disclosure, like reference numbers designate like elements where appropriate and reference numerals with the addition of 100 or multiples thereof designate modified elements that are understood to incorporate the same features and benefits of the corresponding original elements.

In this non-limiting embodiment, the bus bar assembly 164 includes a housing 166, a bus bar 168, a retention device 180 and one or more biasing members 188. In one non-limiting embodiment, the bus bar 168 is a two-piece bus bar that includes a first bus bar portion 168-1 and a second bus bar portion 168-2 that is separate from the first bus bar portion 168-1. Each of the first bus bar portion 168-1 and the second bus bar portion 168-2 may include a bottom flange 191 and a top flange 193 elevated from the bottom flange 191. The first bus bar portion 168-1 and the second bus bar portion 168-2 may be generally Z-shaped, in one non-limiting embodiment.

The top flanges 193 overlap one another once positioned within the housing 166 of the bus bar assembly 164. In addition, openings 195 are formed in both the bottom flanges 191 and the top flanges 193. In one non-limiting embodiment, the openings 195 are oval shaped. However, other shapes are contemplated within the scope of this disclosure.

The two-piece bus bar 168 of this embodiment may be retained in a first position P1 by the retention device 180. For example, the retention device 180 may be received within the aligned openings 195 of the top flanges 193 of both the first bus bar portion 168-1 and the second bus bar portion 168-2 to hold the bus bar 168 in the first position P1. In one embodiment, the retention feature 180 is a movable arm having a tab 182 that may be inserted into the openings 195 of the top flanges 193. However, other configurations are also contemplated. The openings 195 of the bottom flanges 191 are received over pillars 178 of terminals 174 of adjacent battery cells 158-1, 158-2 in the first position P1 (see FIG. 10B).

Figure 11A:
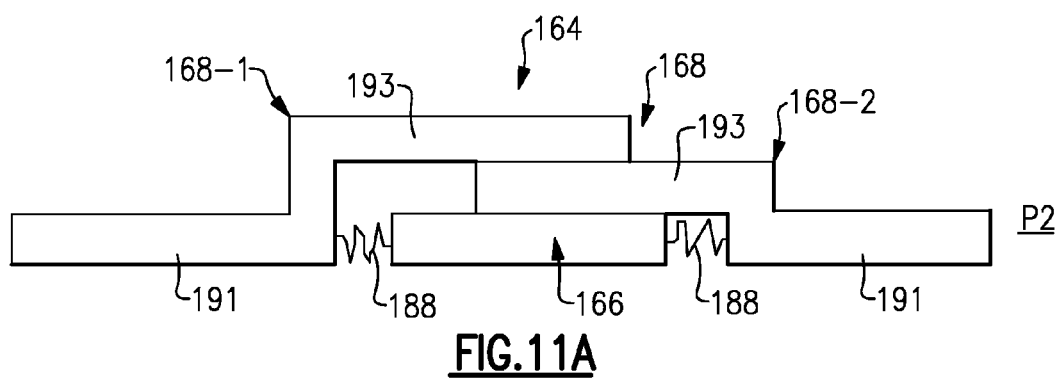
FIGS. 11A and 11B illustrate the bus bar assembly of FIGS. 10A and 10B after movement of a bus bar to a second position.
Figure 11B:
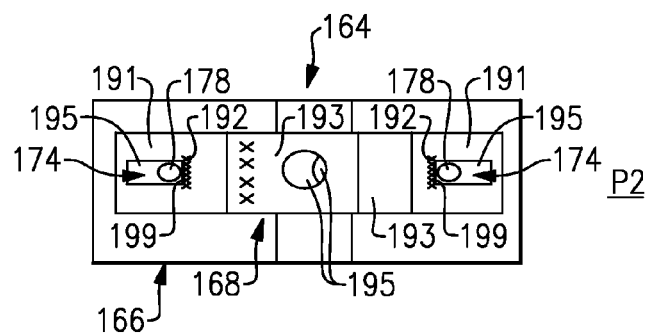

Referring now to FIGS. 11A and 11B (with continued reference to FIGS. 10A and 10B), the retention device 180 may be disengaged from the bus bar 168 to move the bus bar 168 to a second position P2 relative to the terminals 174. In one non-limiting embodiment, the retention device 180 is disengaged by removing the tab 182 from the openings 195 of the top flanges 193 of the first bus bar portion 168-1 and the second bus bar portion 168-2. Once removed, the biasing members 188, which may include springs or other flexible components connected between the housing 166 and the first and second bus bar portions 168-1, 168-2, force the first bus bar portion 168-1 and the second bus bar portion 168-2 of the bus bar 168 to move in opposite directions from one another until the pillars 178 of the terminals 174 abut longitudinal extents 199 of the openings 195 of the bottom flanges 191. In the second position P2, the openings 195 of the top flanges 193 are not aligned with one another (see FIG. 11B).

The bus bar 168 can be connected to the terminals once located in the second position P2. Welds 192 are schematically shown to illustrate this connection. In another embodiment, although not specifically shown, the bus bar 168 may be attached to one or more terminals 174 by a mechanical joint such as a threaded stud and nut. Additionally, the first and second bus bar portions 168-1, 168-2 may also be coupled together. For example, the first and second bus bar portions 168-1, 168-2 may be mechanical coupled together by a fastener or may be coupled together by a weld.

FIGS. 12A and 12B illustrate portions of yet another exemplary bus bar assembly 264. A bus bar 268 of the bus bar assembly 264 is positioned at a first position P1 relative to a housing 266 of the bus bar assembly 264 and terminals 74 of two adjacent battery cells 58-1, 58-2. Although a single bus bar 268 is shown, a plurality of bus bars 268 could be received within the housing 266. In one non-limiting embodiment, the bus bar 268 does not contact the pillars 78 of the terminals 74 when arranged in the first position P1.

A retention device 280 may engage the bus bar 268 to hold it in the first position P1. In one non-limiting embodiment, the retention device 280 is configured as an arm that includes a first retention feature 282 configured to engage a second retention feature 284 of the bus bar 268. In this non-limiting embodiment, the first retention feature 282 is a tab and the second retention feature 284 is an aperture formed in the bus bar 268. The retention device 280 may also extend into an aperture 299 formed in the housing 266 of the bus bar assembly 264 in the first position P1.

Referring now to FIGS. 13A and 13B, the retention device 280 may be disengaged from the bus bar 268 to automatically move the bus bar 268 to a second position P2 relative to the terminals 74. In one non-limiting embodiment, the retention device 280 is disengaged by moving the bus bar assembly 264 in a direction D1 (see FIG. 12A) until it contacts the top surface 72 of one or more battery cells 58. As the bus bar assembly 264 is moved into contact with the top surfaces 72, the retention device 280 pivots about a wall 286 of the housing 266, thereby moving the first retention feature 282 outwardly in a direction away from the second retention feature 284, the bus bar 268, and the aperture 299 of the housing 266. Once the retention device 280 is disengaged, one or more biasing members 288 automatically force the bus bar 268 to the second position P2. The bus bar 268 can be connected to the terminals 74 once located in the second position P2. Welds 292 are schematically shown to illustrate this connection.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An assembly, comprising:
   a plurality of battery cells;
   a bus bar assembly received over said plurality of battery cells, said bus bar assembly comprising:
      a housing;
      a bus bar received within said housing; and
      a retention device disengageable from said bus bar to move said bus bar between a first position and a second position, and said retention device is separate from any portion of said plurality of battery cells.

2. The assembly as recited in claim 1, wherein said bus bar is connectable to a terminal of a first battery cell and a terminal of a second battery cell in said second position.

3. The assembly as recited in claim 1, wherein said housing is made of a first material and said bus bar is made of a second, different material.

4. The assembly as recited in claim 1, wherein said retention device includes a first retention feature configured to engage a second retention feature of said bus bar to retain said bus bar in said first position.

5. The assembly as recited in claim 4, wherein said first retention feature is a tab or an aperture and said second retention feature is the other of said tab and said aperture.

6. The assembly as recited in claim 1, wherein said bus bar includes a body and a first leg and a second leg that protrude from said body.

7. The assembly as recited in claim 6, wherein each of said first leg and said second leg includes a slot.

8. The assembly as recited in claim 7, wherein a bottom of said slot abuts a battery cell terminal in said second position.

9. The assembly as recited in claim 1, wherein said bus bar includes a first bus bar portion and a second bus bar portion separate from said first bus bar portion.

10. The assembly as recited in claim 9, wherein each of said first bus bar portion and said second bus bar portion include a first opening configured to receive said retention device and a second opening configured to receive a portion of a battery cell terminal.

11. The assembly as recited in claim 1, wherein said retention device includes an arm that is integral with said housing.

12. The assembly as recited in claim 1, wherein said retention feature includes an arm that is attached to said housing.

13. The assembly as recited in claim 1, comprising at least one biasing member configured to move said bus bar toward said second position upon disengaging said retention feature from said bus bar.

14. The assembly as recited in claim 13, wherein said at least one biasing member is a spring.

15. The assembly as recited in claim 13, wherein said at least one biasing member is a flexible portion of said housing.

16. A method, comprising:
   positioning a bus bar within a bus bar assembly to locate the bus bar in a first position relative to a battery cell terminal;
   holding the bus bar in the first position with a retention device of the bus bar assembly; and
   moving the bus bar from the first position to a second position by disengaging the retention device from the bus bar.

17. The method as recited in claim 16, wherein the moving step includes moving a first bus bar portion and a second bus bar portion in opposite directions from one another.

18. A bus bar assembly, comprising:
   a housing;
   a bus bar received within said housing; and
   a retention device that is pivotable to disengage said retention device from said bus bar and move said bus bar between a first position and a second position relative to said housing.

19. The method as recited in claim 16, wherein disengaging the retention device from the bus bar includes pivoting the retention device.

20. An assembly, comprising:
   a bus bar assembly including a housing, a bus bar received within said housing, a retention device configured to hold said bus bar in a first position relative to a battery cell, and a biasing member attached to said housing and configured to move said bus bar to a second position relative to said battery cell upon disengaging said retention device from said bus bar.

* * * * *